US012209346B2

(12) United States Patent
Hwang et al.

(10) Patent No.: US 12,209,346 B2
(45) Date of Patent: Jan. 28, 2025

(54) CLOTHES-PROCESSING DEVICE

(71) Applicant: LG ELECTRONICS INC., Seoul (KR)

(72) Inventors: Inseong Hwang, Seoul (KR); Jeongbeom Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/656,768

(22) Filed: May 7, 2024

(65) Prior Publication Data

US 2024/0287728 A1    Aug. 29, 2024

Related U.S. Application Data

(63) Continuation of application No. 17/267,073, filed as application No. PCT/KR2019/010642 on Aug. 21, 2019, now Pat. No. 12,006,619.

(60) Provisional application No. 62/722,973, filed on Aug. 26, 2018.

(51) Int. Cl.
*D06F 34/34*    (2020.01)
*G10L 15/28*    (2013.01)
*D06F 105/60*    (2020.01)

(52) U.S. Cl.
CPC .............. *D06F 34/34* (2020.02); *G10L 15/28* (2013.01); *D06F 2105/60* (2020.02)

(58) Field of Classification Search
CPC ..................................................... D06F 34/34
See application file for complete search history.

(56) References Cited

U.S. PATENT DOCUMENTS

2005/0086979 A1    4/2005    Son et al.
2010/0262865 A1    10/2010   Kim et al.
2017/0037558 A1    2/2017    Dunsbergen et al.
(Continued)

FOREIGN PATENT DOCUMENTS

| CN | 104870704 | 8/2015 |
| CN | 105637139 | 6/2016 |
| CN | 107780122 | 3/2018 |

(Continued)

OTHER PUBLICATIONS

International Search Report (with English Translation) and Written Opinion dated Jan. 3, 2020 issued in Application No. PCT/KR2019/010642.

(Continued)

*Primary Examiner* — Jason Y Ko
(74) *Attorney, Agent, or Firm* — KED & ASSOCIATES, LLP

(57) ABSTRACT

The present invention relates to a clothes-processing device comprising: a cabinet comprising a body; a body front surface fixed to the body and forming the front surface, and an introduction opening formed through the body front surface; a drum comprising a drum body disposed in the cabinet so as to store clothes and a drum introduction opening formed through the drum body to communicate with the introduction opening; a driving part for rotating the drum; a door rotatably disposed at the cabinet so as to open or close the introduction opening; a control part for controlling the driving part; and a voice recognition part disposed at the door so as to recognize a voice generated by a user and transmit a control command corresponding to the recognized voice to the control part.

15 Claims, 7 Drawing Sheets

(56) References Cited

U.S. PATENT DOCUMENTS

2017/0211874 A1    7/2017   Kim et al.

FOREIGN PATENT DOCUMENTS

| | | |
|---|---|---|
| EP | 3613887 | 2/2020 |
| EP | 3733946 | 11/2020 |
| JP | H06-7577 | 1/1994 |
| JP | 2001-129300 | 5/2001 |
| JP | 2013-070831 | 4/2013 |
| KR | 10-2011-0137614 | 12/2011 |
| KR | 10-2014-0072585 | 6/2014 |
| KR | 10-2016-0041886 | 4/2016 |
| KR | 10-2016-0068938 | 6/2016 |
| KR | 10-2018-0086892 | 8/2018 |

OTHER PUBLICATIONS

Chinese Office Action dated Sep. 5, 2022 issued in Application No. 201980055662.X (English translation attached).
Extended European Search Report dated Oct. 6, 2023 issued in Application No. 23187366.2.
European Search Report dated Mar. 25, 2022 issued in Application No. 19855434.7.

[FIG. 1]
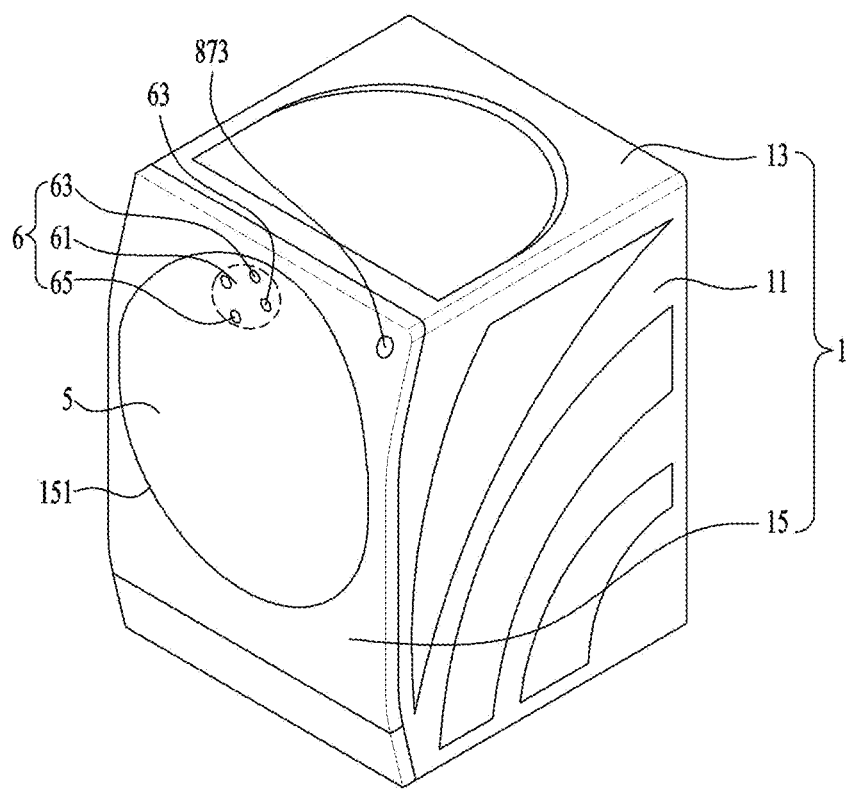

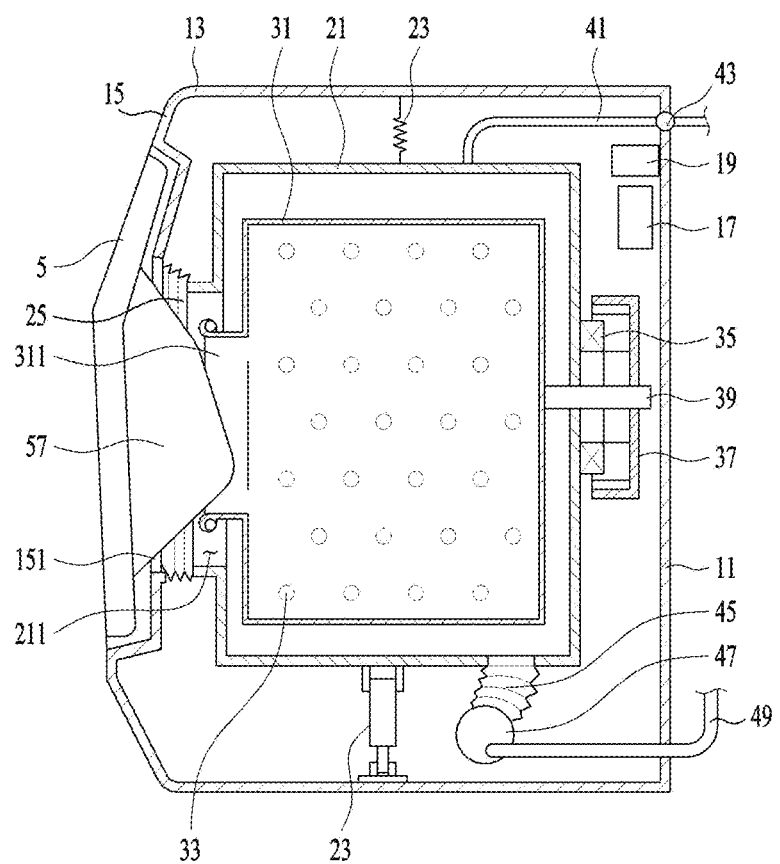
[FIG. 2]

[FIG. 3]
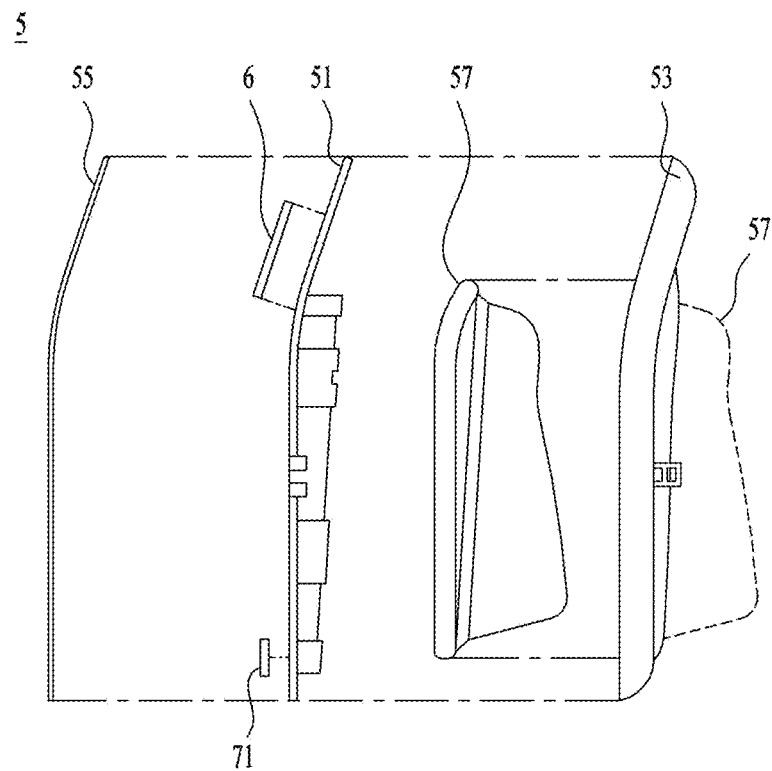
[FIG. 4]
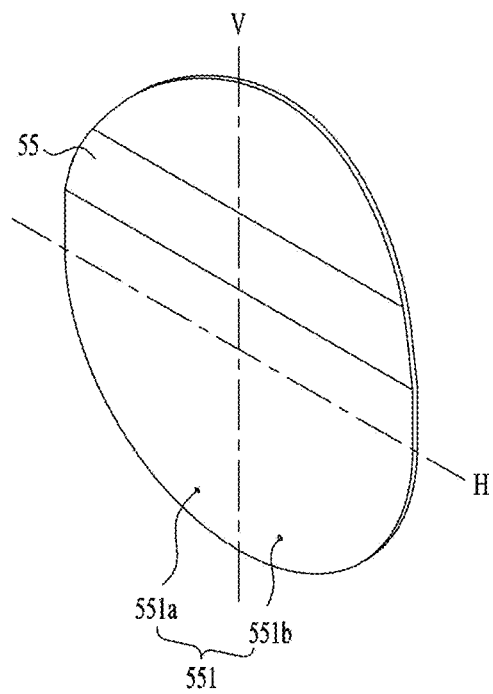

[FIG. 5]
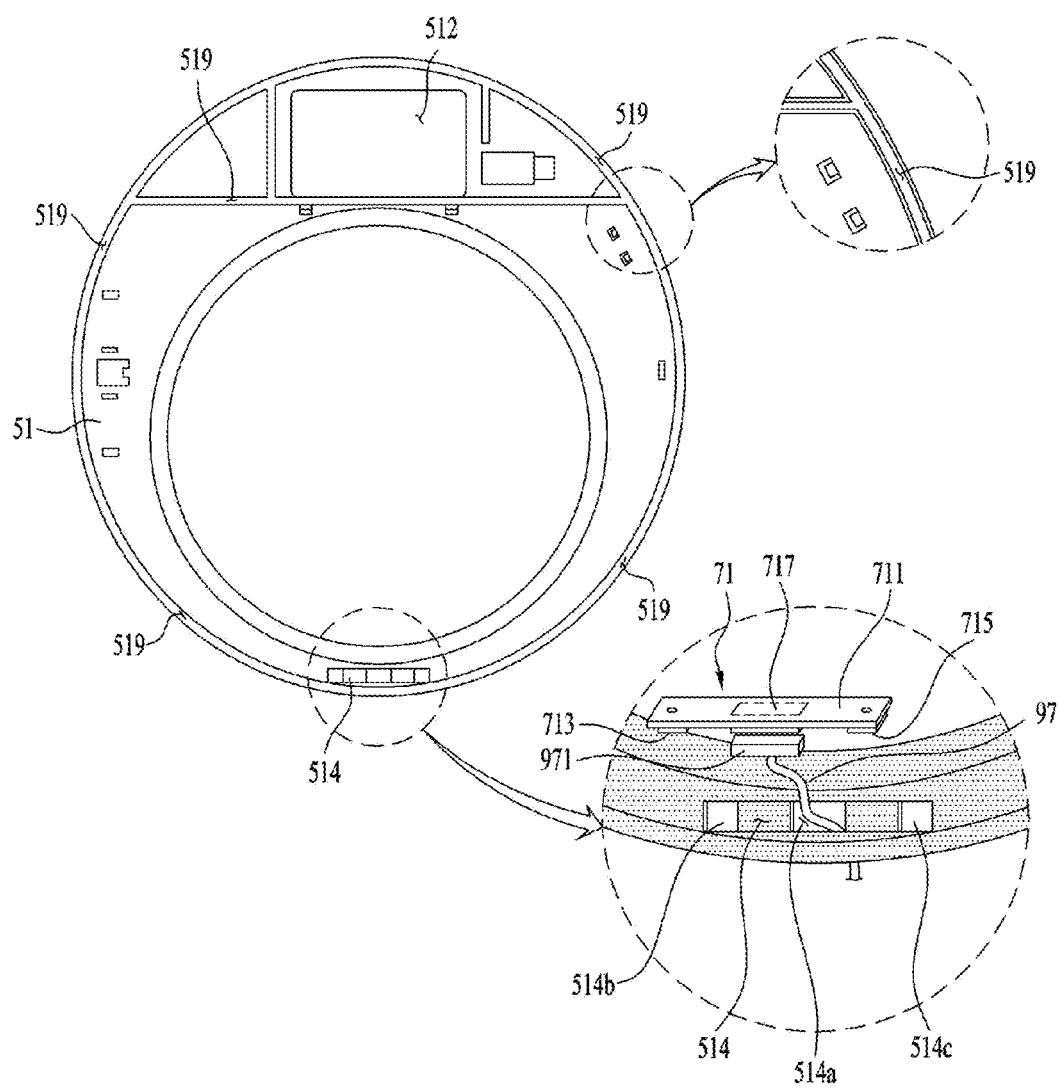

[FIG. 6]
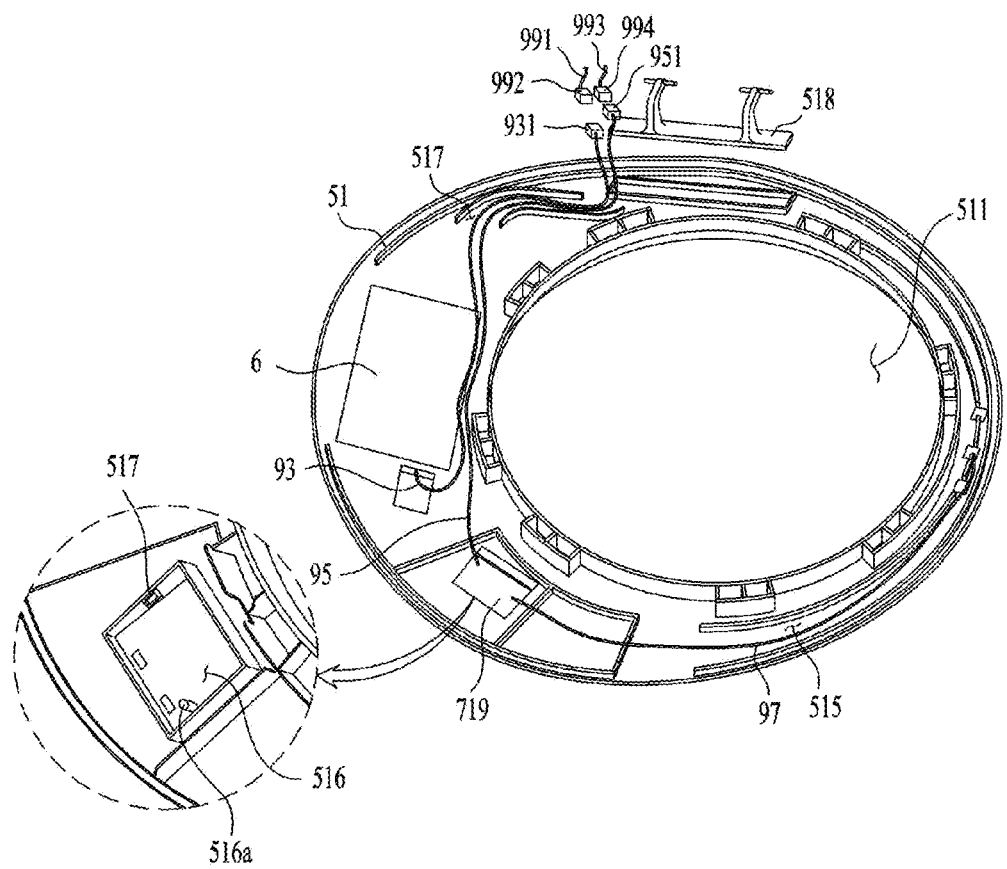

[FIG. 7]
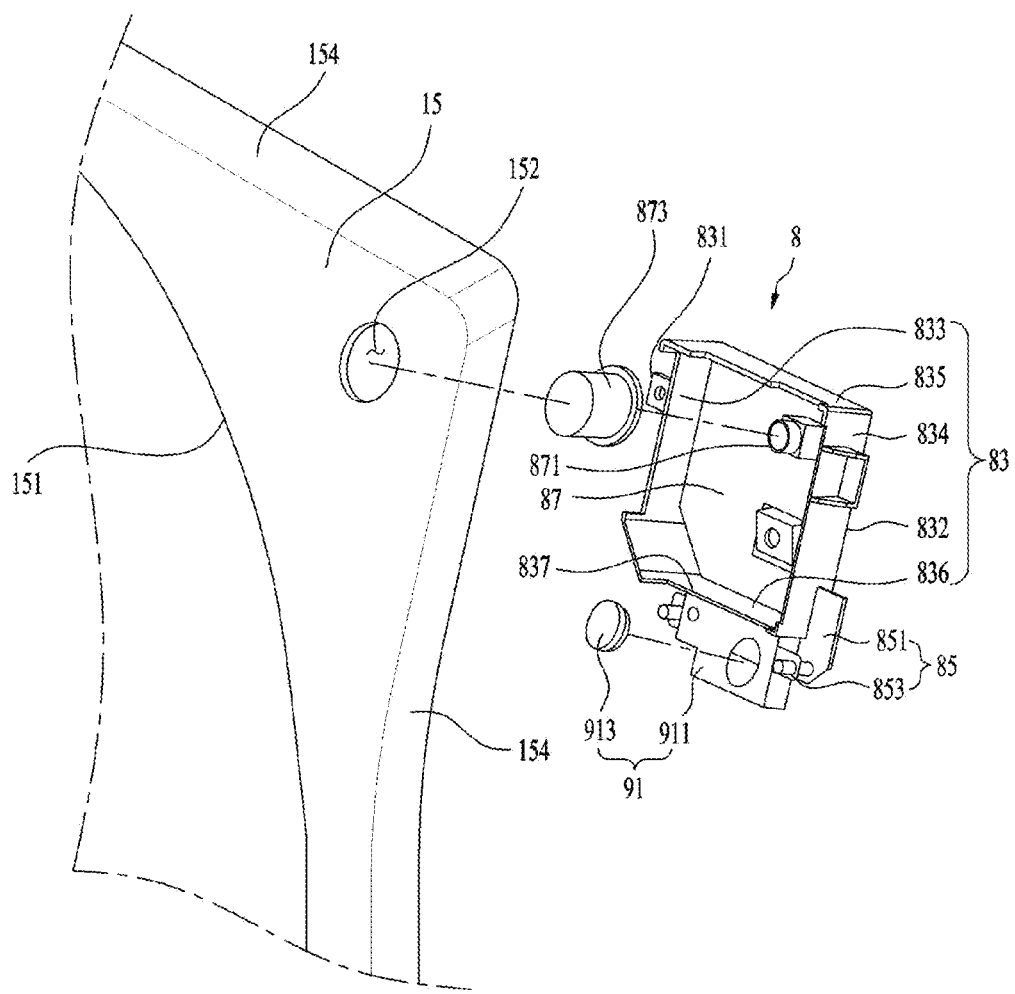

[FIG. 8]
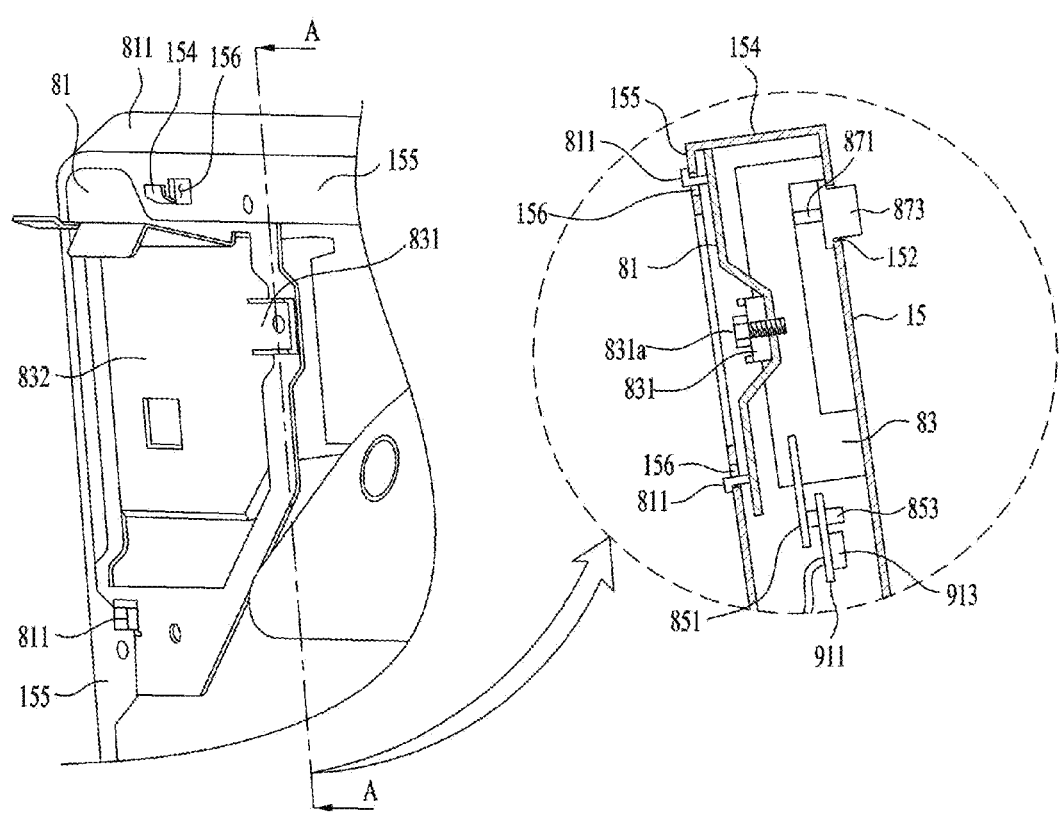

CLOTHES-PROCESSING DEVICE

CROSS-REFERENCE TO RELATED PATENT APPLICATIONS

This application is a Continuation of U.S. application Ser. No. 17/267,073, filed Feb. 9, 2021, which is a U.S. National Stage Application under 35 U.S.C. § 371 of PCT Application No. PCT/KR2019/010642, filed Aug. 21, 2019, which claims priority to U.S. Provisional Patent Application No. 62/722,973, filed Aug. 26, 2018, whose entire disclosures are hereby incorporated by reference.

TECHNICAL FIELD

The present disclosure relates to a laundry treating apparatus.

BACKGROUND ART

A laundry treating apparatus collectively refers to a laundry washing apparatus, a laundry drying apparatus, and an apparatus capable of selectively executing a laundry washing function and a laundry drying function. The laundry washing apparatus is an apparatus for removing contaminant from laundry by rotating a drum, in which laundry is stored, inside a tub in which water is stored (by rubbing laundry with water). The laundry drying apparatus is an apparatus for removing water from the laundry by supplying the heated air to the drum in which the laundry is stored.

The laundry treating apparatus of the related art comprises control panels configured to input a control command from a user and provide the user with information related to an operation of the laundry treating apparatus. It is general that the control panels provided in the laundry treating apparatuses of the related art have an input unit in the form of button or knob or an input unit in the form of touch screen.

Since the aforementioned type input unit of the related art has limitation in controlling the laundry treating apparatus at a position spaced apart from the laundry treating apparatus because a user can manipulate the laundry treating apparatus only if the user should move to a distance to be in contact with the input unit.

DISCLOSURE

Technical Problem

An object of the present disclosure is to provide a laundry treating apparatus that recognizes a user's voice as a control command.

Another object of the present disclosure is to provide a laundry treating apparatus that recognizes a user's voice and is operated in accordance with a control command corresponding to the recognized voice.

Technical Solution

A laundry treating apparatus of the present disclosure comprises a cabinet having an inlet; a drum provided inside the cabinet, storing laundry supplied to the inlet; a driving unit rotating the drum, a door rotatably provided in the cabinet, opening or closing the inlet; and a controller controlling the driving unit; and a voice recognition unit provided in the door, recognizing a voice generated by a user and transmitting a control command corresponding to the recognized voice to the controller.

A laundry treating apparatus of the present disclosure comprises a cabinet including a body, a body front surface fixed to the body, forming a front surface, and an inlet provided to pass through the body front surface; a drum including a drum body provided inside the cabinet, storing laundry therein, and a drum inlet provided to pass through the drum body and communicated with the inlet; a driving unit rotating the drum; a door rotatably provided in the cabinet, opening or closing the inlet; a controller controlling the driving unit; and a voice recognition unit provided in the door, recognizing a voice generated by a user and transmitting a control command corresponding to the recognized voice to the controller.

The door may include a frame rotatably fixed to the cabinet, opening or closing the inlet; a front panel fixed to the frame and located on the body front surface; and a through hole provided to pass through the front panel, and the voice recognition unit may include a microphone located between the front panel and the frame, converting a sound wave entering the through hole into an electrical signal.

The through hole may be provided in an area below a horizontal line passing through a center of the front panel.

The through hole may include first and second through holes respectively located at symmetrical points based on a vertical line passing through the center of the front panel, and the voice recognition unit may include a first microphone located in the first through hole and a second microphone located in the second through hole.

The frame may include a first frame to which the front panel is fixed, and a second frame fixed to the first frame, opening or closing the inlet, and the voice recognition unit may be provided between the first frame and the front panel.

The laundry treating apparatus may further comprise a PCB seating portion formed as a surface of the first frame is bent to be concave in a direction far away from the front panel; a recognition unit PCB located in the PCB seating portion and configured to allow the first microphone and the second microphone to be fixed thereto; a first insertion hole provided to pass through the first frame and located in the PCB seating portion, providing a space in which the first microphone is accommodated; and a second insertion hole provided to pass through the first frame and located in the PCB seating portion, providing a space in which the second microphone is accommodated.

The laundry treating apparatus of the present disclosure may further comprise an analyzer provided in a space formed between the first frame and the second frame, converting an electrical signal provided from the first microphone and the second microphone into text or code and transmitting the converted text or code to the controller.

The laundry treating apparatus of the present disclosure may further comprise an analyzer seating portion provided in any one of the first frame and the second frame, forming a space in which the analyzer is accommodated; and a ventilating hole communicating the inside of the analyzer seating portion with the outside of the analyzer seating portion.

The laundry treating apparatus of the present disclosure may further comprise a seating protrusion protruded from the analyzer seating portion; and a protrusion accommodating portion provided in the analyzer and configured to allow the seating protrusion to be inserted thereinto.

The laundry treating apparatus of the present disclosure may further comprise a connector through hole provided to pass through the first frame and located in the PCB seating portion; a connector provided in the recognition unit PCB and inserted into the connector through hole; a connection wire connecting the analyzer with the connector; and a first guide provided in the first frame, providing a space in which the connection wire is accommodated.

The laundry treating apparatus of the present disclosure may further comprise a front surface through hole provided to pass through the body front surface; a housing fixed to the body front surface and located in the cabinet, having an opened surface headed for the body front surface; a power PCB fixed into the housing and provided with a power circuit connected to a power source; a switch provided to open or close the power circuit; a button having one end inserted into the front surface through hole and exposed to the outside of the body front surface and the other end connected to the switch; and a speaker fixed to the housing.

The speaker may be provided to generate a sound signal indicating the time when the microphone starts recording.

The speaker may be provided to generate a sound signal indicating that voice recognition has been failed when the voice recognition unit fails to convert a sound wave into an electrical signal.

The speaker may be provided to generate a sound signal indicating that voice recognition has been completed when the voice recognition unit completely converts a sound wave into an electrical signal.

The housing may include a base fixed to the body front surface; an accommodating portion provided in the base, forming a space in which the power PCB is accommodated and maintaining an interval between the base and the body front surface; a speaker PCB fixed to the base and located outside the accommodating portion, and configured to allow the speaker to be fixed thereto; and a communication unit provided to pass through the accommodating portion, allowing the sound signal emitted from the speaker to enter the accommodating portion.

The accommodating portion may include first and second surfaces fixed to the base, forming both sides of the housing, third and fourth surfaces fixed to the base, forming an upper surface and a lower surface of the housing, and an opened surface headed for the base, and the communication unit may be provided in at least any one of the first surface, the second surface, the third surface and the fourth surface.

Advantageous Effects

The present disclosure provides a laundry treating apparatus that recognizes a user's voice as a control command.

The present disclosure provides a laundry treating apparatus that recognizes a user's voice and is operated in accordance with a control command corresponding to the recognized voice.

BRIEF DESCRIPTION OF THE DRAWINGS

FIGS. 1 and 2 illustrate an example of a laundry treating apparatus of the present disclosure.

FIG. 3 illustrates an example of a door provided in the present disclosure.

FIG. 4 illustrates an example of a front panel provided in the door.

FIGS. 5 and 6 illustrate an example of a first panel provided in the door.

FIGS. 7 and 8 illustrate an example of a power controller and a sound generator provided in the present disclosure.

BEST MODE FOR CARRYING OUT THE INVENTION

Hereinafter, the preferred embodiments according to the present disclosure will be described with reference to the accompanying drawings. A configuration of an apparatus or a control method thereof, which will be described below, is intended to assist the embodiment of the present disclosure but is not intended to limit the scope of the present disclosure. Wherever possible, the same reference numbers will be used throughout the drawings to refer to the same or like parts.

As shown in FIGS. 1 and 2, a laundry treating apparatus 100 of the present disclosure includes a cabinet 1, a tub 2 provided inside the cabinet, providing a space in which water is stored, and a drum 3 rotatably provided inside the tub, providing a space in which laundry is stored.

As shown in FIG. 1, the cabinet 1 includes a body 11 providing a space in which the tub 2 is accommodated and having an opened front surface, and a body front surface 15 fixed to the body, forming the front surface of the cabinet.

The body 11 may be provided to include a main body forming a left side, a rear side and a right side of the cabinet, a body upper surface 13 fixed to an upper portion of the main body, forming an upper surface of the cabinet, and a body lower surface fixed to the main body, forming a bottom surface of the cabinet.

The body front surface 15 is provided with an inlet 151 communicating the inside of the cabinet 1 with the outside thereof, wherein the inlet 151 is opened or closed by a door 5 rotatably coupled to the cabinet 1.

As shown in FIG. 2, the tub 2 includes a tub body 21 fixed to the cabinet 1 through a tub support 23. The tub body 21 is provided in a hollow cylindrical shape and provides a space in which water is stored. A tub inlet 211 is provided on a front surface of the tub body 21. The tub inlet 211 and the inlet 151 are connected with each other through a gasket 25 provided in a cylindrical shape.

The tub support 23 may be provided with a spring fixing an upper area of a circumferential surface of the tub body 21 to the cabinet 1, and a damper fixing a lower area of the circumferential surface of the tub body 21 to the cabinet.

The tub 2 is supplied with water through a water supply unit, and water inside the tub body 21 is discharged to the outside of the cabinet 1 through a drainage unit. The water supply unit may be provided to include a water supply pipe 41 connecting the tub body 21 with a water supply source, and a water supply valve 43 opening or closing the water supply pipe 41 in accordance with a control signal of a controller 17. The drainage unit may be provided to include a pump 47, a first drainage pipe 45 guiding water of the tub body 21 to the pump 47, and a second drainage pipe 49 guiding water discharged from the pump 47 to the outside of the cabinet.

The drum 3 includes a drum body 31 provided inside the tub body 21. The drum body 31 may be provided in a hollow cylindrical shape, and a drum inlet 311 may be provided on a front surface of the drum body. The drum inlet 311 is provided such that its center is located at the same height as the center of the tub inlet 211. Therefore, a user may insert laundry into the drum body 31 by opening the door 5 or may draw out the laundry inside the drum body 31 to the outside of the cabinet 1.

An inner space of the drum body 31 is communicated with an inner space of the tub body 21 through a drum through hole 33. The drum through hole 33 may be provided as a hole passing through a circumferential surface of the drum body 31, a hole passing through a rear surface of the drum body 31, and a hole passing through the front surface of the drum body 31.

The drum body 31 is rotated by a driving unit controlled by the controller 17, and in FIG. 2, the driving unit may be provided to include a stator 35 fixed to a rear surface of the tub body 21, forming a rotating magnetic field, a rotor 37 located outside the tub body 21 and rotated by the rotating magnetic field, and a rotary shaft 39 provided to pass through the rear surface of the tub body 21, connecting the drum body 31 with the rotor 37.

The laundry treating apparatus 100 for washing of laundry needs both the tub and the drum. However, if the laundry treating apparatus 100 is only intended for drying of laundry, the tub 2 may be omitted. That is, if the laundry treating apparatus 100 is only intended for drying of laundry, the laundry treating apparatus 100 of the present disclosure may comprise a cabinet, a drum provided inside the cabinet, and a driving unit rotating the drum. In this case, an air supply unit for supplying the heated air to the drum 3 should be additionally provided inside the cabinet 1.

The air supply unit may include a supply duct for supplying the air to the drum, an exhaust duct for discharging the air of the drum to the outside of the drum, and a heater provided in the supply duct. Unlike this case, the air supply unit may be provided to include a circulating duct for re-supplying the air discharged from the drum to the drum and a heat exchanger for sequentially executing dehumidification and heating of the air entering the circulating duct.

As shown in FIG. 3, the door 5 may be provided to include frames 51 and 53 rotatably fixed to the cabinet 1, opening or closing the inlet 151, and a front panel 55 fixed to the frames 51 and 53 and located on the body front surface. In this case, a voice recognition unit 71 for recognizing a voice generated by a user and transmitting a control command corresponding to the recognized voice to the controller 17 may be provided between the frames 51 and 53 and the front panel 55.

As shown in FIG. 4, a through hole 551 may be provided on the front panel 55, and the voice recognition unit 71 may be provided as a microphone for converting a sound wave entering the through hole 551 into an electrical signal.

The through hole 551 may be provided in an area below a horizontal line H passing through the center of the front panel 55. The case that the through hole 551 is disposed below the horizontal line H (the case that the voice recognition unit is disposed below the door) is to prevent howling based on a position of the voice recognition unit 71 and a position of a sound generator, which will be described below, from occurring. The sound generator is a means for generating a sound signal indicating the time when the voice recognition unit 71 starts recording, and is provided in a space located above the horizontal line H in the space provided by the body front surface 15. Therefore, if the voice recognition unit 71 and the through hole 551 are located above the horizontal line H, a distance between the sound generator 91 and the voice recognition unit 71 becomes short, whereby it is likely to generate howling. On the other hand, if the voice recognition unit 71 and the through hole 551 are located below the horizontal line H, the likelihood of occurrence of howling may be reduced.

Meanwhile, if the through hole 551 is located below the horizontal line H not above the horizontal line H, the through hole 551 may draw less attention of a user. Therefore, if the through hole 551 is provided in an area below the horizontal line H, an esthetic effect of the laundry treating apparatus 100 may be improved.

In order to enhance a voice recognition rate and minimize the risk of malfunction of the voice recognition function due to disorder of the microphone, the voice recognition unit 71 may be provided with two or more microphones. If the voice recognition unit 71 is provided with a first microphone and a second microphone, the through hole 551 may be provided with a first through hole 551a and a second through hole 551b respectively located at symmetrical points based on a vertical line V passing through the center of the front panel. The first microphone may be provided to convert a sound wave entering the first through hole 551a into an electrical signal, and the second microphone may be provided to convert a sound wave entering the second through hole 551b into an electrical signal.

As shown in FIG. 3, the frames may be provided to include a first frame 51 fixed to the cabinet 1 through a hinge 518 (see FIG. 6) and a second frame 53 fixed to the first frame 51 to open or close the inlet 151. In this case, the front panel 55 may be fixed to the first frame 51, and the voice recognition unit 71 may be located between the first frame 51 and the front panel 55.

The door 5 may further include a window 57 that allows the inside of the drum body 31 to be observed from the outside the cabinet 1 through the drum inlet 311. To this end, the first frame 51 may be provided with a first frame through hole 511 (see FIG. 5) and the second frame 53 may be provided with a second frame through hole (not shown), and an area (first transparent area) of the front panel 55, which corresponds to the first frame through hole 511, may be provided transparently.

The window 57 is provided in a cylindrical shape having one surface which is opened, and may have one end fixed to the first frame 51 and the other end inserted into the second frame through hole. The opened surface of the cylindrical shape should be fixed to the first frame 51 to surround the first frame through hole 511.

As shown in FIG. 5, the first frame 51 is provided with an adhesive accommodating portion 519 for providing a space in which an adhesive fixing the front panel 55 to the first frame 51 is accommodated. The adhesive accommodating portion 519 may be provided as a groove provided along an edge of the first frame 51.

The first frame 51 may further be provided with a control panel seating portion 512 to which the control panel 6 is fixed. The control panel seating portion 512 may be provided as a through hole passing through the first frame 51 or a groove formed as a surface of the first frame 51 is bent to be concave.

As shown in FIG. 1, the control panel 6 includes input units 63 and 65 to which a control command from a user is input, and a display unit 61 displaying an execution process of a control command that may be selected by the user and a control command selected by the user. The input units may include a first input unit 63 to which the control command is input, and a second input unit 65 to which a start signal or stop signal of the selected control command is input.

If the control panel 6 is located between the front panel 55 and the first frame 51, the front panel 55 should be provided with a transparent area (second transparent area) for exposing the control panel 6 to the outside. The control panel 6 may be provided as a touch screen. In this case, the input units may be provided as input panels located between the display unit 61 and the second transparent area, generating an electrical signal by sensing static electricity of a user body. The input panels should be made of transparent panels.

In order that a user easily inputs a control command through the control panel 6, the control panel 6 is preferably located above the horizontal line H passing through the center of the front panel. To this end, as shown in FIG. 5, the control panel seating portion 512 is preferably located above the first frame through hole 511.

The voice recognition unit 71 provided in the present disclosure may be provided to include a recognition unit PCB 711, a first microphone 713 provided in the recognition unit PCB, a second microphone 715 provided in the recognition PCB, and an analyzer 719 transmitting electrical signals provided by the microphones 713 and 715 to the controller 17.

The recognition unit PCB 711 is a circuit board provided with a circuit for supplying a power to the microphones 713 and 715 and a circuit for allowing the microphones 713 and 715 to perform communication with the controller 17. The first microphone 713 is fixed to the recognition unit PCB 711 and located at the rear of the first through hole 551a, and the second microphone 713 is fixed to the recognition unit PCB 711 and located at the rear of the second through hole 551b.

FIG. 6 illustrates a rear surface of the first frame 51, wherein the analyzer 719 may be fixed to the rear surface of the first frame 51 and thus fixed to a space formed between the first frame 51 and the second frame 53. The analyzer 719 converts the electrical signal transmitted from each of the microphones 713 and 715 into text or code, and transmits the converted text or code to the controller 17.

The first frame 51 is provided with an analyzer seating portion 516 for providing a space in which the analyzer 719 is seated, wherein the analyzer seating portion 516 may be provided as a chamber provided in a shape that may accommodate the analyzer, having an opened surface headed for the second frame 53.

In order that the analyzer 719 is easily assembled into the first frame 51, the analyzer seating portion 516 may be provided with a seating protrusion 516a, and the analyzer 719 may be provided with a protrusion accommodating portion (not shown) into which the seating protrusion 516a is inserted. The protrusion accommodating portion may be provided as a hole passing through an analyzer housing forming external appearance of the analyzer 719 or a groove formed as the analyzer housing is bent to be concave.

Since the door 5 is a means for opening or closing the tub inlet 211, it is difficult to exclude the possibility of water inside the tub body 21 to enter the space between the frames 51 and 53. If the water entering the space between the first frame 51 and the second frame 53 remains in the analyzer seating portion 516, a problem may occur in that durability of the analyzer 719 is deteriorated. In order to solve the problem, the analyzer seating portion 516 may further be provided with a ventilating hole 517. The ventilating hole 517 may be provided as any one of a hole passing through a wall forming the analyzer seating portion 516 and a hole communicated with the analyzer seating portion 516 by passing through the first frame 51.

The analyzer 719 is connected to the controller 17 through a recognition unit wire 95 and a controller wire 993 (controller second wire), and the recognition unit PCB 711 is connected to the analyzer 719 through a connection wire 97.

For easy connection between the recognition unit wire 95 and the controller second wire 903, a recognition wire connector 951 may be provided at a free end of the recognition unit wire 95, and a controller second connector 994 may be provided at a free end of the controller second wire 993. The recognition unit wire connector 951 is detachably connected to the controller second connector 994.

As shown in FIG. 5, a connection wire connector 971 may be provided at a free end of the connection wire 97, and a connector 717 to which the connection wire connector 971 is detachably coupled may be provided in the recognition unit PCB 711.

The aforementioned voice recognition unit 71 may be fixed to the PCB seating portion 514 provided in the first frame 51. The PCB seating portion 514 is a means for providing a space in which the recognition unit PCB 711 is accommodated, and may be provided as a groove formed as one surface (the front surface of the first frame) of the first frame 51 headed for the front panel 55 is bent to be concave in a direction far away from the front panel 55.

The PCB seating portion 514 is provided with a connector through hole 514a provided to pass through the first frame 51 and allow the connector 717 to be inserted thereinto. Therefore, the connection wire connector 971 may be coupled to the connector 717 through the connector through hole 514a.

Also, the PCB seating portion 514 may be provided with a first insertion hole 514b provided to pass through the first frame 51 and allow the first microphone 713 to be inserted thereinto, and a second insertion hole 514c provided to pass through the first frame 51 and allow the second microphone 715 to be inserted thereinto.

A depth of the PCB seating portion 514 may be set to a thickness of the recognition unit PCB 711 or less. If the depth of the PCB seating portion 514 is set to be smaller than the thickness of the recognition unit PCB 711, in the present disclosure, the recognition unit PCB 711 may be fixed to the PCB seating portion 514 even without a fastening means such as bolt or adhesive. Since the front panel 55 is fixed to the first frame 51 through the adhesive, if the front panel 55 has only to be fixed to the first frame 51, the recognition unit PCB 711 may be pressurized toward the PCB seating portion 514 by the front panel 55.

As shown in FIG. 6, a first guide 515 providing a space in which the connection wire 97 is accommodated and a second guide 517 providing a space in which the recognition unit wire 95 is accommodated may further be provided on the rear surface of the first frame 51. When the first guide 515 and the second guide 517 are means for preventing the connection wire 97 and the recognition unit wire 95 from being damaged by the second frame 53 when the second frame 53 is coupled to the first frame 51.

The first guide 515 may be provided as a groove extended from the connector through hole 514a toward a direction where the analyzer seating portion 516 is located, and the second guide 517 may be provided as a groove extended from the hinge 518 toward a direction where the analyzer seating portion 516 is located.

The aforementioned control panel 6 may be connected to the controller 17 through a panel wire 93. The panel wire 93 is connected to a controller wire 991 (controller first wire) connected to the controller 17. For easy connection between the panel wire 93 and the controller first wire 991, a panel wire connector 931 may be provided at a free end of the panel wire 93, and a controller first connector 992 may be provided at a free end of the controller first wire 991. The panel wire connector 931 is detachably connected to the controller first connector 992.

As shown in FIG. 7, the laundry treating apparatus 100 of the present disclosure is provided with a power controller 8. The power controller 8 is a means for controlling power supply to a load (controller, water supply valve, pump, stator, control panel, etc.) operated when a power is supplied thereto.

The power controller 8 includes a bracket 81 fixed to the body front surface 15, a housing 83 fixed to the bracket, and a power PCB 87 provided with a power circuit and fixed to the housing 83.

As shown in FIG. 8, a first bent portion 154 bent toward the body 11 of the cabinet and a second bent portion 155 bent from the first bent portion 154 and fixed to the body 11 are provided at the edge of the body front surface 15.

The bracket 81 may be fixed to the body front surface 15 through the second bent portion 155. That is, the second bent portion 155 is provided with a bent portion through hole 156 provided to pass the second bent portion, and the bracket 81 may be provided with a bracket protrusion 811 detachably coupled to the bent portion through hole 156.

The housing 83 is fixed to the bracket 81 and thus located inside the cabinet 1. FIG. 8 illustrates that the housing 83 is located in a space (space formed by the first bent portion) formed between the bracket 81 and the body front surface 15, as an example.

The housing 83 may be provided in any shape as far as the surface headed for the body front surface 15 forms an opened chamber. The housing 83 may be fixed to the bracket 81 through a fixed plate 831 and a bolt 831*a*. The fixed plate 831 may be provided as a board protruded from the housing 83 and provided with a fixed plate through hole into which the bolt 831*a* is inserted, and the bracket 81 may be provided with a bracket through hole to which the bolt 831*a* is fixed.

As shown in FIG. 7, the housing 83 may be provided to include a base 832 fixed to the bracket 81 through the fixed plate 831, and accommodating portions 833, 834, 835 and 836 provided in the base 832 to a space in which the power PCB 87 is accommodated, maintaining an interval between the base 832 and the body front surface 15.

The accommodating portions may be provided to include first and second surfaces 833 and 834 provided at left and right sides of the base 832, forming both sides of the housing, and third and fourth surfaces 835 and 836 provided at upper and lower sides of the base 832, forming an upper surface and a lower surface of the housing. In this case, an opened surface may be formed on a surface facing the base 832.

The power PCB 87 is a circuit board provided with a power circuit connected to a power source, and is fixed to the base 832 and located inside the accommodating portions. The power PCB 87 is provided with a switch 871 opening or closing the power circuit, wherein the switch 871 is operated by a button 873. An upper surface of the power PCB 87 may be coated with an insulating material to prevent the power PCB 87 from being in contact with liquid such as water.

The cabinet 1 is provided with a front surface through hole 152 passing through the body front surface 15, wherein the front surface through hole 152 should be provided to be communicated with a space formed by the accommodating portions 833, 834, 835 and 836. That is, a point where the front surface through hole 152 is projected to the housing 83 should be provided to be located inside the space formed by the accommodating portions 833, 834, 835 and 836.

One end of the button 873 is provided to have one end inserted into the front surface through hole 152 and exposed to the outside of the cabinet and the other end connected to the switch 871. The switch 871 may be provided to repeatedly open and close the power circuit whenever an external force is input through the button 873. In this case, if a user pushes the button 873 once, the power circuit will be closed (power will be supplied to load), and if the user pushes the button 873 once more, the power circuit will be opened (power supplied to load will be interrupted).

The laundry treating apparatus of the present disclosure may further include a sound generator 91 generating a sound signal indicating the time when the microphones 713 and 715 of the voice recognition unit 71 starts recording. The sound generator 91 may be provided to include a speaker PCB 911 fixed to the housing 83 and a speaker 913 fixed to the speaker PCB.

The speaker PCB 911 is a circuit board comprising a circuit supplying a power to the speaker 913 and a circuit enabling the speaker 913 to perform communication with the controller 17. The speaker PCB 911 is fixed to the housing 83 through a support 85.

The support 85 may be fixed to any one of four surfaces 833, 834, 835 and 836 forming the accommodating portions, and as an example, FIG. 7 illustrates that the support 85 is provided on the fourth surface 836. In this case, the speaker PCB 811 will be located outside the accommodating portions 833, 834, 835 and 836. The support 85 may be provided with a support plate 851 fixed to the fourth surface 836 and a fastening protrusion 853 provided on the support plate. The fastening protrusion 853 may be provided at each of left and right sides of the support plate 851 and inserted into the PCB through hole provided to pass through the speaker PCB 911.

Meanwhile, if the speaker 913 is located outside the accommodating portions 833, 834, 835 and 836, a problem may occur in that the sound signal generated by the speaker 913 is not transferred to the outside of the cabinet 1. In order to solve the problem, a communication unit 837 may further be provided to allow the sound signal generated by the speaker 913 to enter the accommodating portions 833, 834, 835 and 836 by communicating the inside of the accommodating portions 833, 834, 835 and 836 with the outside thereof. FIG. 7 illustrates that the communication unit 837 is provided on the fourth surface 836, as an example.

The sound signal generated by the speaker 913 may enter the accommodating portions 833, 834, 835 and 836 through the communication unit 837, and the sound signal entering the accommodating portions 833, 834, 835 and 836 may be discharged to the outside of the cabinet 1 through a space formed between the front surface through hole 152 and a circumferential surface of the button 873. Therefore, the present disclosure may transfer the sound signal discharged from the speaker 913 to the outside of the cabinet 1 even without forming a separate hole for discharging the sound signal on the body front surface 15.

Unlike the aforementioned description, the speaker PCB 911 and the speaker 913 may be fixed into the accommodating portions 833, 834, 835 and 836. In this case, the communication hole 837 may be omitted.

Since the speaker 913 is located above the horizontal line H passing through the center of the front panel in the space provided by the body front surface 15, howling generated when the distance between the speaker 913 and the microphones 713 and 715 is short may be minimized.

The speaker 913 may be provided to generate a sound signal indicating that voice recognition has been failed when the voice recognition unit 71 fails to convert a sound wave into an electrical signal. This is to guide a user to input a control command through voice once more when voice recognition is failed. Moreover, the speaker 913 may be provided to generate a sound signal indicating that voice recognition has been completed when the voice recognition unit 71 completes conversion of the sound wave to an electrical signal.

Although not shown, the voice recognition unit provided in the present disclosure may further include a server located outside the cabinet 1, and a communication unit 19 (see FIG. 2) allowing the server to perform communication with the analyzer 719. In this case, the sound wave received by the microphones 713 and 715 is transferred to the analyzer 719, the analyzer 719 transmits the sound wave to the server through the communication unit 19, and the server converts the received sound wave into text or code and then transmits the converted text or code to the controller through the communication unit 19.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

The invention claimed is:

1. A laundry treating apparatus comprising:
   a cabinet including a body front surface forming a front surface, and an inlet provided to pass through the body front surface;
   a drum including a drum body provided inside the cabinet, storing laundry therein, and a drum inlet provided to pass through the drum body and communicated with the inlet;
   a front surface through hole provided to pass through the body front surface;
   a switch configured to open or close a power circuit connected to a power source;
   a button having one end inserted into the front surface through hole and exposed to the outside of the body front surface and the other end connected to the switch; and
   a speaker,
   wherein a sound signal generated by the speaker is discharged to the outside of the cabinet through a space formed between the front surface through hole and a circumferential surface of the button.

2. The laundry treating apparatus of claim 1, comprising:
   a door rotatably provided in the cabinet for opening or closing the inlet;
   a driving unit for rotating the drum; and
   a controller for controlling the driving unit.

3. The laundry treating apparatus of claim 2, further comprising a voice recognition unit provided in the door, for recognizing a voice generated by a user and transmitting a control command corresponding to the recognized voice to the controller.

4. The laundry treating apparatus of claim 2, wherein the door includes:
   a frame rotatably fixed to the cabinet, for opening or closing the inlet;
   a front panel fixed to the frame and located on the body front surface; and
   a through hole provided to pass through the front panel.

5. The laundry treating apparatus of claim 4, wherein the voice recognition unit includes a microphone located between the front panel and the frame, for converting a sound wave entering the through hole into an electrical signal.

6. The laundry treating apparatus of claim 4, wherein the voice recognition unit is provided in an area below a horizontal line passing through a center of the front panel.

7. The laundry treating apparatus of claim 4, wherein the front surface through hole is provided in an area above a horizontal line passing through a center of the front panel.

8. The laundry treating apparatus of claim 4, wherein the through hole is provided in an area below a horizontal line passing through a center of the front panel.

9. The laundry treating apparatus of claim 1, comprising a sound generator, wherein the sound generator comprises a speaker PCB and the speaker fixed to the speaker.

10. The laundry treating apparatus of claim 9, further comprising:
    a housing fixed to the body front surface and located in the cabinet, having an opened surface headed for the body front surface; and
    a power PCB fixed to the housing and provided with the power circuit.

11. The laundry treating apparatus of claim 10, wherein the speaker PCB is fixed to the housing.

12. The laundry treating apparatus of claim 3, wherein the speaker generates a sound signal indicating the time when the voice recognition unit starts recording.

13. The laundry treating apparatus of claim 3, wherein the speaker generates a sound signal indicating that voice recognition has failed when the voice recognition unit fails to convert a sound wave into an electrical signal.

14. The laundry treating apparatus of claim 10, wherein the housing includes:
    a base fixed to the body front surface;
    an accommodating portion provided in the base, forming a space in which the power PCB is accommodated and maintaining an interval between the base and the body front surface; and
    a communication unit provided to pass through the accommodating portion, allowing the sound signal emitted from the speaker to enter the accommodating portion;
    wherein the speaker PCB is fixed to the housing through a support.

15. The laundry treating apparatus of claim 14, wherein the accommodating portion includes first and second surfaces fixed to the base, forming both sides of the housing, third and fourth surfaces fixed to the base, forming an upper surface and a lower surface of the housing, and an opened surface headed for the base, and the communication unit is provided in at least any one of the first surface, the second surface, the third surface and the fourth surface.

* * * * *